(12) United States Patent
Dwivedi

(10) Patent No.: US 7,429,030 B2
(45) Date of Patent: *Sep. 30, 2008

(54) VARIABLE RADIAL FLOW RATE CONTROL SYSTEM

(75) Inventor: Alok Dwivedi, Baku (AZ)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/777,771

(22) Filed: Jul. 13, 2007

(65) Prior Publication Data

US 2007/0257225 A1   Nov. 8, 2007

Related U.S. Application Data

(63) Continuation of application No. 11/160,251, filed on Jun. 15, 2005, now Pat. No. 7,258,323.

(51) Int. Cl.
*F16K 31/00* (2006.01)
(52) U.S. Cl. ............... 251/345; 251/343; 166/332.2
(58) Field of Classification Search ............ 251/343, 251/344, 345, 346; 166/316, 332.1, 332.2
See application file for complete search history.

(56) References Cited

U.S. PATENT DOCUMENTS

| 2,631,000 | A | * | 3/1953 | Hampton | 251/343 |
| 4,429,747 | A | * | 2/1984 | Williamson, Jr. | 166/321 |
| 4,520,870 | A | * | 6/1985 | Pringle | 166/317 |
| 4,771,831 | A | * | 9/1988 | Pringle et al. | 166/319 |
| 4,782,896 | A | * | 11/1988 | Witten | 166/116 |
| 6,112,816 | A | * | 9/2000 | Orzechowski et al. | 166/324 |
| 6,308,783 | B2 | * | 10/2001 | Pringle et al. | 166/320 |
| 6,622,984 | B2 | * | 9/2003 | Rauch et al. | 251/71 |
| 6,631,767 | B2 | * | 10/2003 | Pringle et al. | 166/320 |
| 6,745,843 | B2 | * | 6/2004 | Johnson et al. | 166/386 |
| 6,860,330 | B2 | * | 3/2005 | Jackson | 166/332.1 |
| 6,880,638 | B2 | * | 4/2005 | Haughom et al. | 166/316 |
| 2004/0046143 | A1 | * | 3/2004 | Haughom et al. | 251/304 |

* cited by examiner

*Primary Examiner*—John K Fristoe, Jr.
(74) *Attorney, Agent, or Firm*—Bryan P. Galloway; Daryl R. Wright; Winstead Sechrest & Minick

(57) ABSTRACT

A variable radial flow rate control valve including a body forming a bore along the longitudinal axis thereof for transporting a fluid through the body, a fixed choke member fixedly positioned about the bore, the fixed choke member forming a fixed aperture, a rotational choke member rotationally positioned about the bore, the rotational choke member forming a rotational aperture radially corresponding to the fixed aperture, wherein a fluid passage is formed radially between the bore and the exterior of the body when the corresponding apertures overlap. The rotational choke member is rotatably, but not axially, moveable in relation to the fixed choke member between variable radial flow rate positions.

20 Claims, 5 Drawing Sheets

VARIABLE RADIAL FLOW RATE CONTROL SYSTEM

RELATED APPLICATIONS

This application is a continuation of U.S. application Ser. No. 11/160,251, filed Jun. 15, 2005.

FIELD OF THE INVENTION

The present invention relates in general to a system for controlling radial flow of fluid into and/or out of a string of tubing. More particularly, the invention relates to a system for selectively controlling the radial flow rate between the tubing and the wellbore.

BACKGROUND

In completing a well, one or more zones may be perforated to enable production and/or injection of fluids. Completion equipment including flow control devices, tubing, packers, and other devices may be installed in various positions in the well to manage the respective zones. In operating the well it is necessary to actuate the flow control device for each zone.

Typically each flow control device is actuated either hydraulically or electrically. Each flow control valve being connected to a separate hydraulic and/or electrical control line from the other flow control valves. Additionally, the flow control valves are typically operated between a full-flow or full-open position and a full-closed position, and do not permit operation of selected choked flow rate positions.

It is thus a desire of the present invention to provide a variable flow control valve and system that addresses failures of the prior art flow control valves and systems. It is a still further desire to provide a variable flow control valve and system that provides benefits over the prior flow control valves and systems.

SUMMARY OF THE INVENTION

In view of the foregoing and other considerations, the present invention relates to variable radial flow control valves and valve systems. The valve of the system may be incorporated in a tubing string placed in a wellbore to control the flow between the tubing string and exterior of the tubing string. In particular, the multiple valves may be utilized in the tubing string to control the radial rate of flow between individual formation zones and the tubing string. Multiple variable flow controls may be utilized in the system with operational control via a single control line.

A variable radial flow rate control valve of the present invention includes a body forming a bore along the longitudinal axis thereof for transporting a fluid through the body; a fixed choke member fixedly positioned about the bore, the fixed choke member forming a fixed aperture; a rotational choke member rotationally positioned about the bore, the rotational choke member forming a rotational aperture radially corresponding to the fixed aperture; a fluid passage formed radially between the bore and the exterior of the body when the corresponding apertures overlap; a motor functionally connected to the rotational choke member by a sleeve linearly moveable relative to the longitudinal axis of the body and a rotational sleeve in rotating connection between the linear sleeve and the rotational choke member, wherein the rotational sleeve and the rotational choke member rotate about the longitudinal axis of the body in response to linear movement of the linear sleeve. Wherein the rotational choke member is rotatably, but not axially, moveable in relation to the fixed choke member between variable radial flow rate positions.

The foregoing has outlined the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

The foregoing and other features and aspects of the present invention will be best understood with reference to the following detailed description of a specific embodiment of the invention, when read in conjunction with the accompanying drawings, wherein.

DETAILED DESCRIPTION

Figure 1:
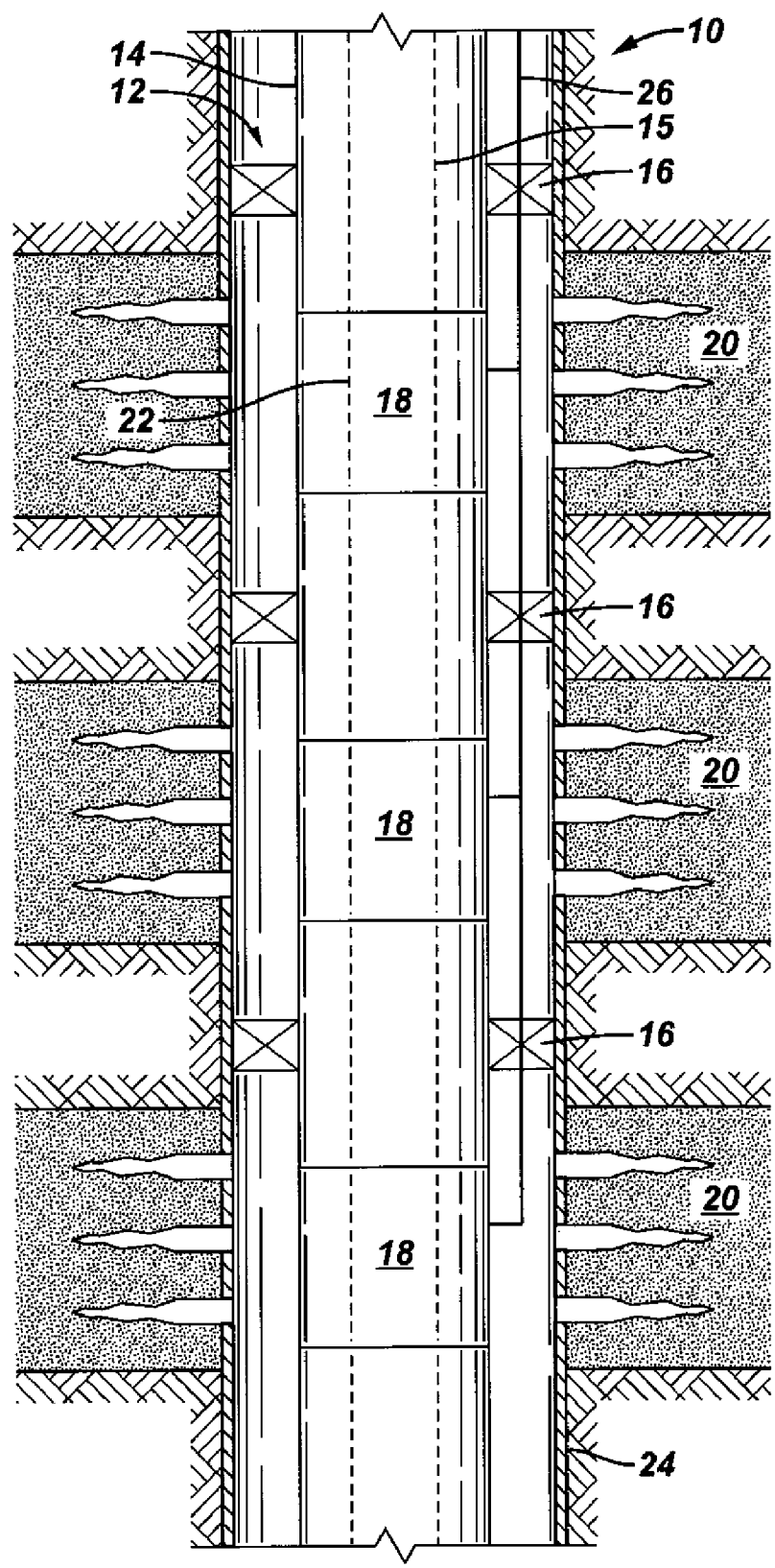
FIG. 1 is a schematic view of an embodiment of the variable radial flow rate control system of the present invention.

Refer now to the drawings wherein depicted elements are not necessarily shown to scale and wherein like or similar elements are designated by the same reference numeral through the several views.

As used herein, the terms "up" and "down"; "upper" and "lower"; and other like terms indicating relative positions to a given point or element are utilized to more clearly describe some elements of the embodiments of the invention. Commonly, these terms relate to a reference point as the surface from which drilling operations are initiated as being the top point and the total depth of the well being the lowest point.

The following Figures and description provide a variable radial flow control system, having a first rotational choke member in fluid communication with a second fixed choke member. A motor end is connected to the first rotational choke member for moving the rotational choke between variable radial flow rate positions including a full-closed position, blocking fluid flow through the device, a full-open position, allowing unchoked flow through the device, and choked positions. The variable flow control device facilitates selectively controlling the flow rate through the device between the full-closed and full-open positions.

FIG. 1 is schematic illustration of an embodiment of the variable radial flow rate control system, generally denoted by the numeral 10, of the present invention positioned in a wellbore 12. The completion string includes a tubing 14 having a bore 15, a packer 16, and a plurality of variable flow control devices 18. Each flow control device is positioned proximate a formation zone 20. Variable flow control devices 18 include a bore 22 that is co-axially aligned with tubing bore 15. Wellbore 12 may be lined with a casing 24. It is to be recognized that the present embodiment is described in relation to controlling the radial flow rate between the exterior and interior of a tubing string, however, the present invention is applicable for and includes controlling the flow rate of other devices, such as, but not limited to, safety valves and gas lift valves.

In the hydraulic embodiments, variable flow control devices 18 may be connected sequentially to a single hydraulic control line 26. Each variable flow control device 18 may be independently controlled via single control line 26. In the electrically driven embodiments of variable flow control valve 18, control line 26 is electrical.

Figure 2:
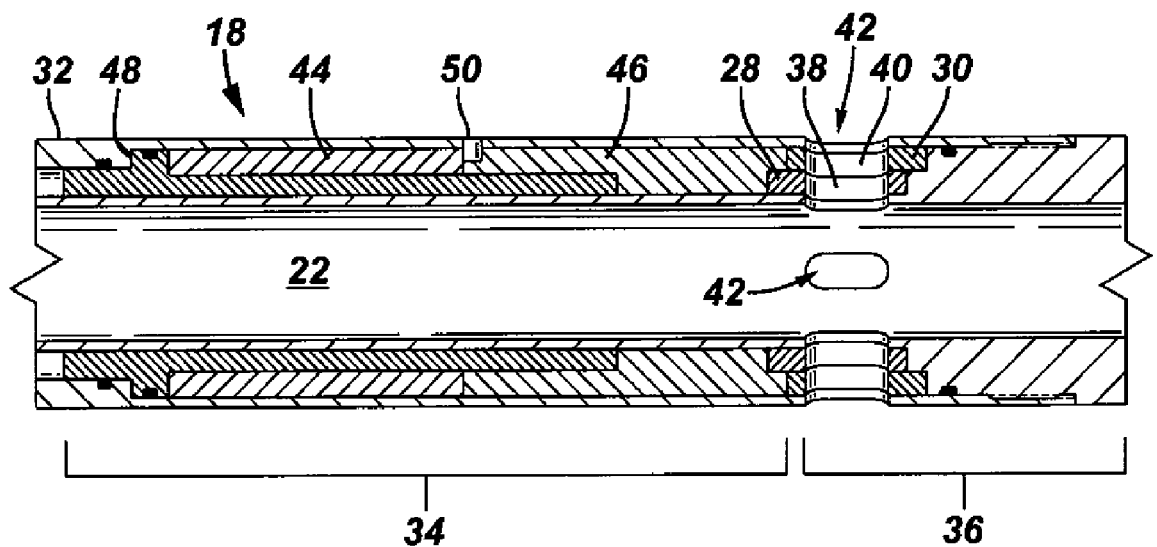
FIG. 2 is a cut-away view of a hydraulically controlled variable flow control valve comprising a pair of cylindrical choke sleeve members in accordance with an embodiment of the present invention.
Figure 3:
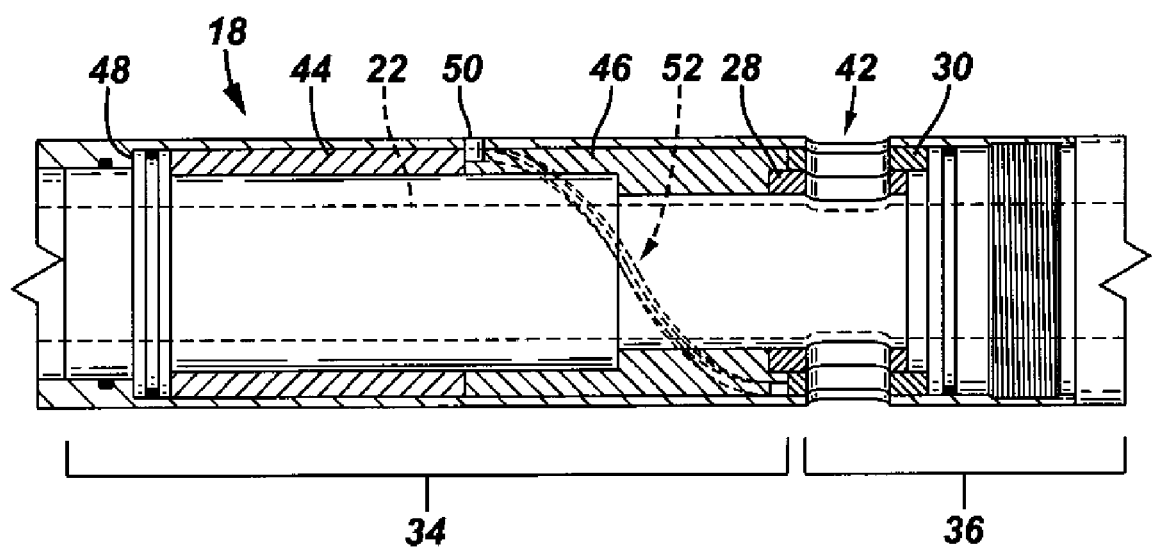
FIG. 3 is a cut-away view of the variable flow control valve of FIG. 2.
Figure 4:
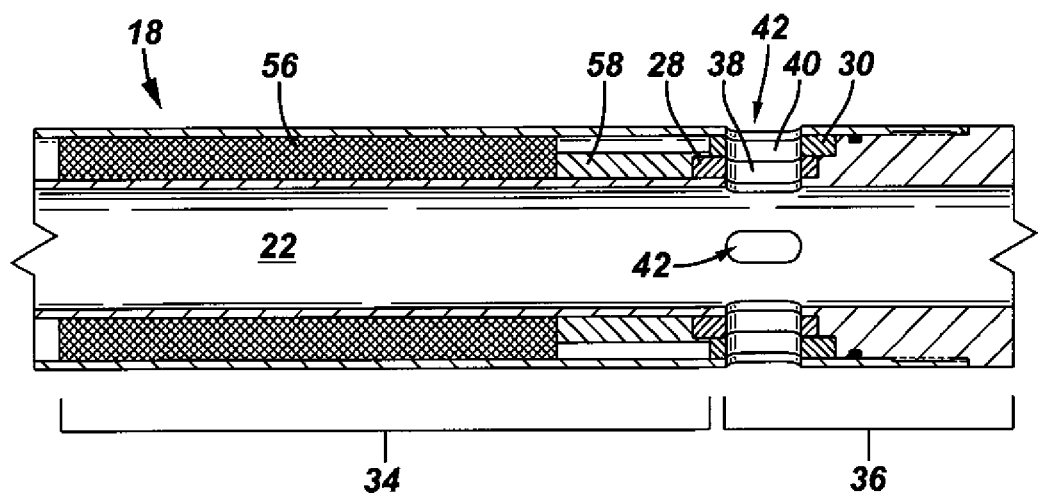
FIG. 4 is a is a cut-away view of an electrically controlled variable flow control valve comprising a pair of cylindrical choke sleeves.

FIG. 2-4 are cut-away views of variable flow control device 18 wherein choke members 28, 30 are cylindrical sleeve members. With reference to FIG. 2, a cut-away view of a hydraulically controlled embodiment of variable flow control valve 18 is provided. Valve 18 comprises a body 32, motor end 34, flow control end 36, a pair of choke members 28, 30 in fluid communication with one another.

Flow control end 36 includes a pair of cylindrical choke sleeve members 28 and 30. Choke sleeves 28, 30 are mounted in a circumscribed manner, wherein one choke sleeve is positioned within the other choke sleeve about bore 22. First choke sleeve 28 is rotatably moveable in relation to second choke sleeve 30 and bore 22. Rotatable choke sleeve 28 is not axially moveable in relation to second choke sleeve 30. Second choke sleeve 30 is in a fixed, non-moveable position. Rotational choke sleeve 28 forms a rotating aperture 38 and fixed choke sleeve 30 form a fixed aperture 40. When apertures 38, 40 overlap a radial fluid passage 42 is formed between the interior of valve 18 (bore 22) and the exterior of valve 18 (formation zone 20). Flow control valve 18 is in the full-open position when aperture 38 and 40 are aligned to form a full cross-section fluid passage 42 between bore 22 and the exterior of valve 18. Full-open passage 42 allows unchoked fluid flow through passage 42. In the full-closed position, first choke sleeve 28 is rotated so that aperture 38 is offset from aperture 40 eliminating flow passage 42. In a choked position (FIG. 5B), rotating aperture 38 is not concentrically aligned with fixed aperture 40, defining a reduced cross-section passage 42 relative to the full-open position. Valve 18 may be selectively operated between various choke positions by rotating first sleeve 28 so that aperture 38 and 40 overlap, reducing the flow area of passage 42 and choking the fluid flow.

A polished seal is formed between rotational choke sleeve 28 and fixed choke sleeve 30. Choke sleeves 28 and 30 may be formed by any suitable material, including, but not limited to ceramic., steel, or carbide.

Although apertures 38, 40 and passage 42 are shown in FIGS. 2-4 as being transverse to the axis of bore 22, it should be recognized that they may be at any angle in relation to bore 22. It should farther be recognized that rotational choke member 28 may have a plurality of rotating apertures 38, each aperture 38 being radially alignable with a corresponding fixed aperture 40. It should be further recognized that a plurality of corresponding radial sets of apertures 38, 40 may be provided axially along the device to achieve a desired flow rate area.

Flow control end 36 is operated between the varying fluid flow control positions by motor end 34. Motor end 34 is in functional connection with first choke sleeve 28 in a manner to convert linear motion to rotational movement of first choke sleeve 28.

In the embodiment illustrated in FIGS. 2, 3, and 5, motor end 34 is a hydraulic motor. Hydraulic motor end 34 includes a linear sleeve 44 in operational connection with a rotational sleeve 46. Linear sleeve 44 is mounted such that when hydraulic pressure is applied through control line 26 (FIG. 1) to a first hydraulic piston portion 48 it moves linearly and parallel to the longitudinal axis of valve 18. Rotational sleeve 46 is connected between linear sleeve 44 and rotational choke sleeve 28. Sleeve 46 is rotationally connected to linear motor sleeve 44 in a manner such that it rotates in relation to the linear movement of sleeve 44. Rotational choke sleeve 28 and rotational motor sleeve 46 are connected such that they move in unison.

FIG. 3 is a cut-away view of radial flow control valve 18 of FIG. 1 illustrating the linear-to-rotational movement and connection of rotational motor sleeve 46. The rotational connection includes a key 50 and a helical slot 52. Key 50 extends from either body housing 32 or rotational sleeve 46 and is slidably connected within helical slot 52 which is formed along a surface of the other of sleeve 46 or housing 32, and splines between sleeves 44 and 46 (FIG. 5B). In operation, as linear sleeve 44 moves linearly along sleeve 46, sleeve 46 and rotational choke sleeve 28 rotate in unison. Key 50 may include a roller bearing to reduce the friction between key 50 and helical slot 52.

FIG. 4 is a cut-away view of another embodiment of flow control valve 18 of the present invention. Flow control valve 18 includes a flow control end 36 as described in relation to FIGS. 2 and 3. Motor end 34 comprises an electric motor 56 and a rotational linkage 58. Linkage 58 is connected between rotation choke sleeve 28 and motor 56 to transfer the rotational torque supplied by motor 56 to rotational choke sleeve 28.

Figure 5A:
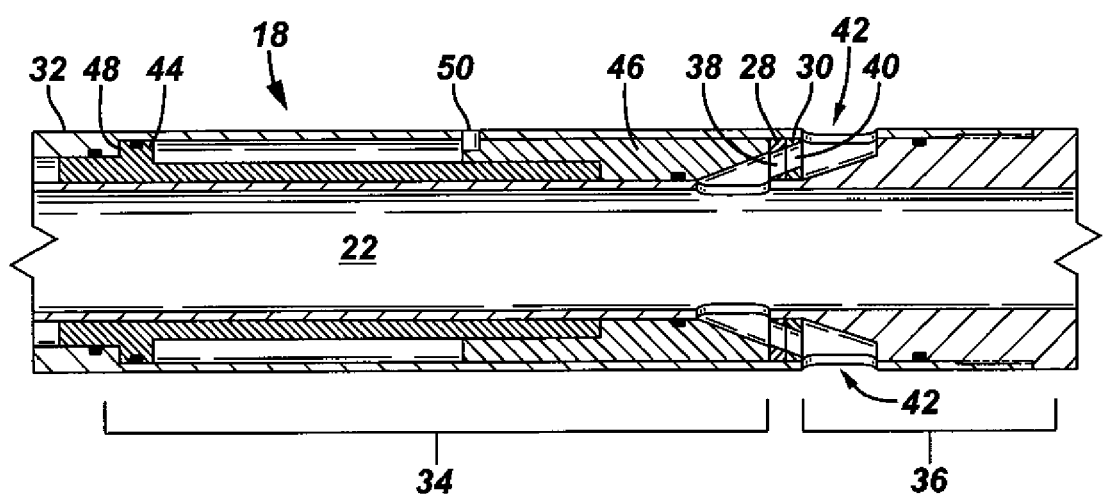
FIG. 5A is a cut-away view of another embodiment of a hydraulically controlled variable flow control valve comprising disc-shaped choke members shown in a full-open position.
Figure 5B:
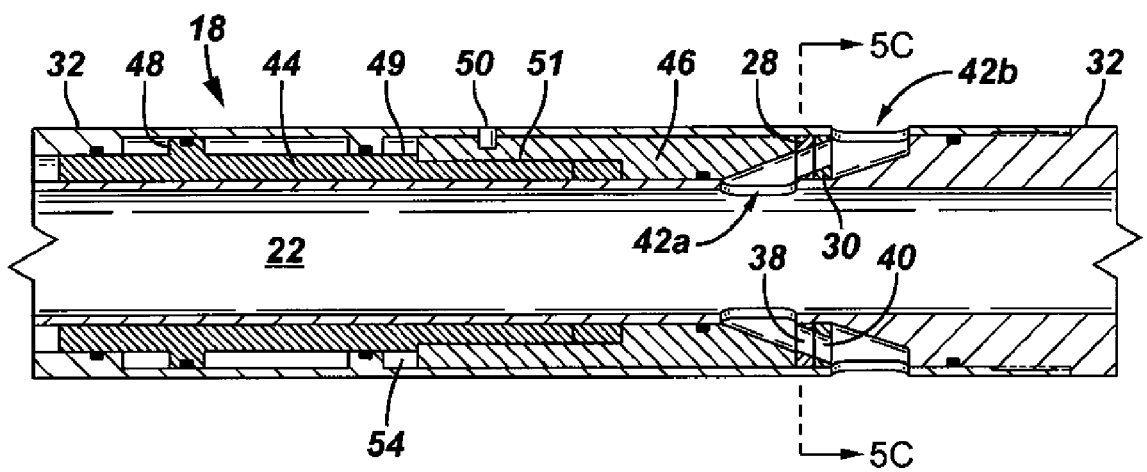
FIG. 5B is a cut-away view of another embodiment of a hydraulically controlled variable flow control valve comprising disc-shaped choke members shown in a choked position, between the full-open and full-closed position.
Figure 5C:
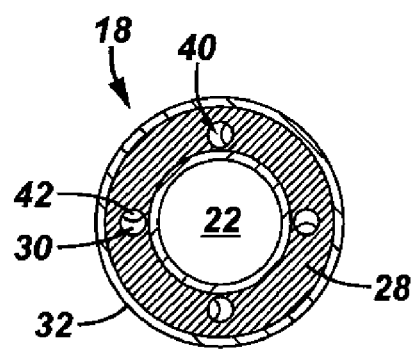
FIG. 5C is a cut-away view of the radial flow control valve along the line 5C-5C of FIG. 5B.
Figure 6:
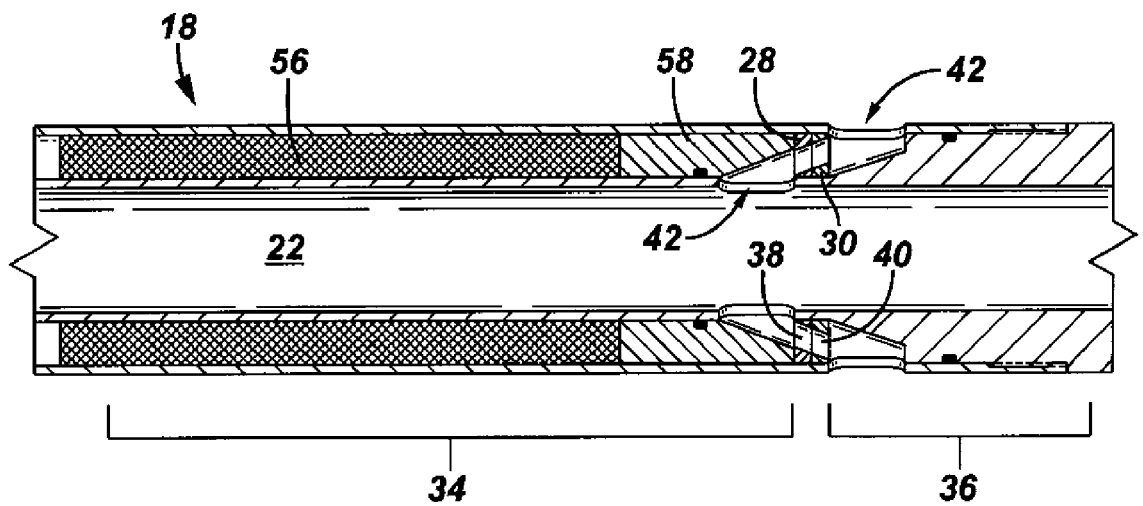
FIG. 6 is a cut-away view of an electrically controlled variable flow control valve comprising disc-shaped choke members.
Figure 7:
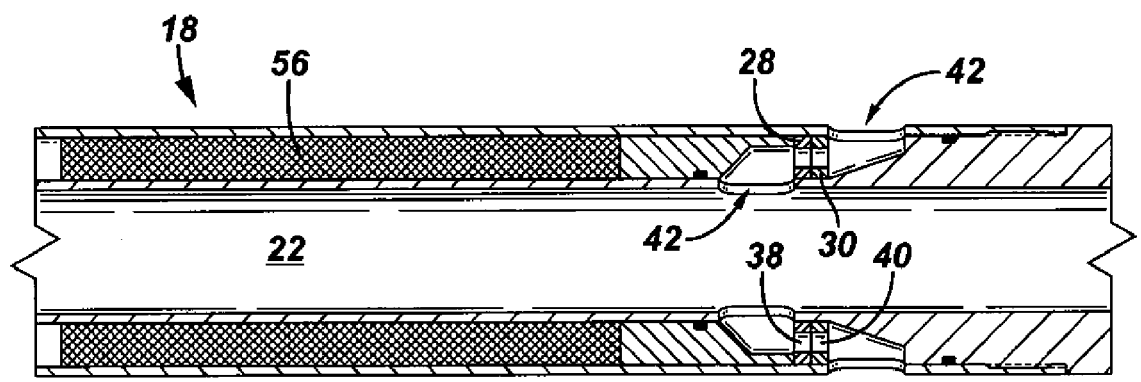
FIG. 7 is a cut-away view of another embodiment of a variable flow control valve comprising disc-shaped choke members.

FIG. 5 through 7 are cut-away views of variable flow control devices 18 wherein choke members 18, 20 are each separate disc-shaped members.

FIG. 5A is an illustration of a hydraulically controlled variable radial flow control valve 18 shown in a full-open position. Variable flow control valve 18 includes a body 32, motor end 34, flow control end 36, and a rotational disc-shaped choke member 28 in fluid communication with a fixed disc-shaped choke member 30.

Rotational choke disc 28 is rotationally mounted in body housing 32 so as to rotate about bore 22 and the longitudinal axis of valve 18. Rotational choke disc 28 does not move axially. Fixed choke disc 30 is mounted in a fixed and unmoving manner within body 32 abutting rotational disc 28, wherein bore 22 passes substantially through the longitudinal axis of choke members 28 and 30. Rotational choke disc 28 forms an aperture 38 corresponding with an aperture 40 formed through fixed choke disc 30. When apertures 38 and 40 are in flow alignment with one another they form a passage 42 between the interior of valve 18 (bore 22) and the exterior of valve 18 (formation zone 20).

Apertures 38, 40 may be oriented at any angle relative to the longitudinal axis as shown in FIGS. 5 and 6. Apertures 38, 40 may be oriented substantially parallel to the longitudinal axis of valve 18 and bore 22, to form radial fluid passage 42 angled from bore 22.

A polished seal is formed between rotational choke disc 28 and fixed choke disc 30. Choke discs 28 and 30 may be formed of any suitable material, including, but not limited to polished ceramic, steel, or carbide.

FIG. 5B is a cross-sectional view cut-away view of another embodiment of a hydraulically controlled variable flow control valve 18 comprising disc-shaped choke members 28, 30 shown in a choked position, between the full-open and full-closed position. In the choked position the cross-sectional area of fluid passage 42 formed by rotating aperture 38 and fixed aperture 40 is reduced. The arrow denoted as 42*a* shows the direction of fluid flow through the fluid passage when injecting a fluid. The arrow denoted as 42*b* shows the direction of fluid flow through the fluid passage when a fluid is being produced.

FIG. 5B shows flow control valve 18 further including a biasing mechanism 54. Biasing mechanism 54 is illustrated as a second hydraulic piston portion of linear sleeve 44, urging sleeves 44 and 46 to their initial operating position. When hydraulic pressure is released at hydraulic piston portion 48 and applied at second hydraulic piston portion 54, biasing mechanism 54 returns flow control valve 18 to its default, initial operating position. It should be recognized that the initial operating position may be full-open, full-closed or a choked flow rate position. Biasing mechanism 54 may include any suitable means for providing a biasing force, including, but not limited to, mechanical and nitrogen springs, hydraulic pressure and wellbore pressure.

As described in relation to FIG. 3, rotating sleeve 46 may include a key 50 and helical slot 52 for rotational connection. The rotational connection may further included corresponding splines 49, 51 formed between linear sleeve 44 and rotational sleeve 46. Linear-to-rotational movement connections are well known in the art and are therefore not described in detail herein.

FIG. 5C is a cut-away view of radial flow control valve 18 along the line 5C-5C of FIG. 5B, showing valve 18 in a choked flow position. Rotating disc choke member 28 is shown rotated in relation to fixed disc choke member 30 such that rotating aperture 38 is not concentrically aligned with fixed aperture 40 forming a reduced fluid passage 42 cross-section, choking fluid therethrough.

FIGS. 6 and 7 illustrate electrically controlled variable flow control valves 18 having choke disc members 28, 30. FIG. 6 illustrates apertures 38 and 40 oriented at angles to bore 22. FIG. 7 illustrates apertures 38 and 40 oriented substantially parallel to bore 22. Valves 18 of FIGS. 6 and 7 operate in the manner as is described with reference to FIG. 4.

From the foregoing detailed description of specific embodiments of the invention, it should be apparent that a variable radial flow rate control system that is novel and unobvious has been disclosed. Although specific embodiments of the invention have been disclosed herein in some detail, this has been done solely for the purposes of describing various features and aspects of the invention, and is not intended to be limiting with respect to the scope of the invention. It is contemplated that various substitutions, alterations, and/or modifications, including but not limited to those implementation variations which may have been suggested herein, may be made to the disclosed embodiments without departing from the spirit and scope of the invention as defined by the appended claims which follow.

What is claimed is:

1. A variable radial flow rate control valve, the valve comprising:
    a body forming a bore along the longitudinal axis thereof for transporting a fluid through the body;
    a fixed choke member fixedly positioned about the bore, the fixed choke member forming a fixed aperture;
    a rotational choke member rotationally positioned about the bore, the rotational choke member forming a rotational aperture radially corresponding to the fixed aperture;
    a fluid passage formed radially between the bore and the exterior of the body when the corresponding apertures overlap;
    a motor functionally connected to the rotational choke member by a sleeve linearly moveable relative to the longitudinal axis of the body and a rotational sleeve in rotating connection between the linear sleeve and the rotational choke member, wherein the rotational sleeve and the rotational choke member rotate about the longitudinal axis of the body in response to linear movement of the linear sleeve:
    wherein the rotational choke member is rotatably, but not axially, moveable in relation to the fixed choke member between variable radial flow rate positions.

2. The valve of claim 1, further including a control line in operation connection with the motor.

3. The valve of claim 1, further including a biasing mechanism urging the rotational choke member to an initial operating position.

4. The valve of claim 3, wherein the initial position may be a full-open, full-closed, or choked flow position.

5. The valve of claim 1, wherein the motor is electrically driven.

6. The valve of claim 1, wherein the motor is hydraulically driven.

7. The valve of claim 1, wherein the rotational connection of the rotational sleeve includes a key slidably carried in a helical slot.

8. The valve of claim 7, further including a biasing mechanism urging the rotational choke member to an initial operating position.

9. The valve of claim 8, wherein the initial position may be a full-open, full-closed, or choked flow position.

10. The valve of claim 1, wherein the body is connectable within a tubing string disposed in a wellbore, the tubing having a bore.

11. The valve of claim 10, wherein the bore of the body is co-axially aligned with the tubing bore.

12. A variable flow rate control valve system, the system comprising:
    a body forming a bore along the longitudinal axis thereof for transporting a fluid through the body;
    a fixed choke sleeve and a rotational choke sleeve mounted one inside of the other about the bore of the body;
    a fixed aperture formed through the fixed choke sleeve;
    a rotational aperture formed through the rotational choke sleeve radially corresponding to the fixed aperture;
    a fluid passage formed between the bore and the exterior of the body when the corresponding apertures overlap; and
    a motor functionally connected to the rotational choke sleeve by a sleeve linearly moveable relative to the longitudinal axis of the body and a rotational sleeve in rotating connection between the linear sleeve and the rotational choke sleeve, wherein the rotational sleeve and the rotational choke sleeve rotate about the longitudinal axis of the body in response to linear movement of the linear sleeve:
    wherein the rotational choke sleeve is rotatably, but not axially, moveable in relation to the fixed choke sleeve between variable radial flow rate positions.

13. The system of claim 12, wherein the rotational connection of the rotational sleeve includes a key slidably carried in a helical slot.

14. The system of claim 12, further including a biasing mechanism urging the rotational choke member to an initial operating position.

15. The system of claim 14, wherein the initial position may be a full-open, full-closed, or choked flow position.

16. A variable flow rate control valve system, the system comprising:
 a body forming a bore along the longitudinal axis thereof for transporting a fluid through the body;
 a fixed choke disc fixedly positioned about the bore, the fixed choke disc forming a fixed aperture;
 a rotational choke disc rotationally positioned about the bore, the rotational choke disc forming a rotational aperture radially corresponding to the fixed aperture;
 a fluid passage formed between the bore and the exterior of the body when the corresponding apertures overlap; and
 a motor functionally connected to the rotational choke disc by a sleeve linearly moveable relative to the longitudinal axis of the body and a rotational sleeve in rotating connection between the linear sleeve and the rotational choke disc, wherein the rotational sleeve and the rotational choke disc rotate about the longitudinal axis of the body in response to linear movement of the linear sleeve;
 wherein the rotational choke disc is rotatably, but not axially, moveable in relation to the fixed choke disc between variable radial flow rate positions.

17. The system of claim 16, wherein the rotational connection of the rotational sleeve includes a key slidably carried in a helical slot.

18. The system of claim 16, further including a biasing mechanism urging the rotational choke member to an initial operating position.

19. The system of claim 18, wherein the initial position may be a full-open, full-closed, or choked flow position.

20. The system of claim 19, wherein the rotational connection of the rotational sleeve includes a key slidably carried in a helical slot.

\* \* \* \* \*